(12) United States Patent
Kapinos et al.

(10) Patent No.: US 11,570,140 B1
(45) Date of Patent: Jan. 31, 2023

(54) DETECTING AND CORRECTING COLLIDING MEDIA ACCESS CONTROL ADDRESSES

(71) Applicant: Lenovo Global Technology (United States) Inc., Morrisville, NC (US)

(72) Inventors: Robert J Kapinos, Durham, NC (US); Scott Li, Cary, NC (US); Robert James Norton, Jr., Raleigh, NC (US); Russell Speight VanBlon, Raleigh, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 0 days.

(21) Appl. No.: 17/880,402

(22) Filed: Aug. 3, 2022

(51) Int. Cl.
*H04L 61/30* (2022.01)
*H04L 41/22* (2022.01)
*H04L 61/5046* (2022.01)

(52) U.S. Cl.
CPC .......... *H04L 61/3005* (2013.01); *H04L 41/22* (2013.01); *H04L 61/5046* (2022.05)

(58) Field of Classification Search
None
See application file for complete search history.

(56) References Cited

U.S. PATENT DOCUMENTS

| | | | | |
|---|---|---|---|---|
| 6,895,004 | B1* | 5/2005 | Freeman | H04L 61/5046 370/389 |
| 2003/0177267 | A1* | 9/2003 | Orava | H04L 63/0407 709/245 |
| 2008/0250123 | A1* | 10/2008 | Chae | H04L 61/103 709/223 |
| 2018/0077742 | A1* | 3/2018 | Pang | H04L 61/5046 |
| 2022/0103319 | A1* | 3/2022 | Kanaya | H04W 76/10 |

OTHER PUBLICATIONS

"MAC Address Rewrite," Gigamon, known about and downloaded on Apr. 15, 2022, pp. 1-4.

* cited by examiner

*Primary Examiner* — Mohamed Ibrahim
(74) *Attorney, Agent, or Firm* — Kunzler Bean & Adamson; Bruce R. Needham

(57) ABSTRACT

An apparatus for correcting MAC addresses includes a device port for connecting to a computing device with a colliding MAC address with potential to collide with MAC addresses of other computing devices within a computer network. The apparatus includes a network port for connecting to a network device connected to other computing devices. A reassignment module is configured to assign a non-colliding MAC address in place of the colliding MAC address of the computing device and a replacement module is configured to replace the colliding MAC address of a datagram received on the device port with the non-colliding MAC address and transmit the datagram with the non-colliding MAC address from the network port to the network device, and to replace the non-colliding MAC address of a datagram received on the network port with the colliding MAC address and transmit the datagram with the colliding MAC address to the computing device.

20 Claims, 6 Drawing Sheets

DETECTING AND CORRECTING COLLIDING MEDIA ACCESS CONTROL ADDRESSES

FIELD

The subject matter disclosed herein relates to network communications and more particularly relates to detecting and correcting colliding media access control ("MAC") addresses for Open Systems Interconnection ("OSI") layer 2 communications.

BACKGROUND

In some computer networks, computing devices may include a MAC address that matches the MAC address of another computing device and communication of datagrams on the computer network may then result in a collision. In some instances, computing devices have the same MAC addresses, especially in instances of prototype computing devices or computing devices being manufactured and not yet having a unique MAC address assigned.

BRIEF SUMMARY

An apparatus for detecting and correcting colliding MAC addresses includes a device port configured to connect to a computing device that includes a colliding MAC address that has a potential to collide with other MAC addresses of other computing devices within a computer network. The apparatus includes a network port configured to connect to a network device. The apparatus includes a reassignment module configured to assign a non-colliding MAC address to be used in place of the colliding MAC address of the computing device and a replacement module configured to replace the colliding MAC address of a datagram received on the device port with the non-colliding MAC address and transmit the datagram with the non-colliding MAC address from the network port to the network device, and to replace the non-colliding MAC address of a datagram received on the network port with the colliding MAC address and transmit the datagram with the colliding MAC address from the device port to the computing device.

A method for detecting and correcting colliding MAC addresses includes assigning a non-colliding MAC address to be used in place of a colliding MAC address of a computing device. The colliding MAC address has a potential to collide with other MAC addresses of other computing devices within a computer network. The method includes replacing the colliding MAC address of a datagram received on a device port with the non-colliding MAC address and transmitting the datagram with the non-colliding MAC address from a network port to a network device. The device port is configured to connect to the computing device and the network port is configured to connect to the network device. The method includes replacing the non-colliding MAC address of a datagram received on the network port with the colliding MAC address and transmitting the datagram with the colliding MAC address from the device port to the computing device.

An apparatus for detecting and correcting colliding MAC addresses includes a device port configured to connect to a computing device with a MAC address assigned to the computing device. The apparatus includes a network port configured to connect to a network device of a computer network, where the network device is connected to one or more other computing devices, and a potential collision module configured to compare the MAC address assigned to the computing device with a list of colliding MAC addresses. The colliding MAC addresses of the list of colliding MAC addresses each have a potential to collide with other MAC addresses of the other computing devices within the computer network. The apparatus includes a selection module configured to, in response to the MAC address assigned to the computing device matching a colliding MAC address of the list of colliding MAC addresses, select a non-colliding MAC address from an address pool with non-colliding MAC addresses, where the MAC address assigned to the computing device is a colliding MAC address. The apparatus includes a reassignment module configured to assign the selected non-colliding MAC address to be used in place of the colliding MAC address of the computing device, and a replacement module configured to replace the colliding MAC address of a datagram received on the device port with the non-colliding MAC address and transmit the datagram with the non-colliding MAC address from the network port to the network device, and to replace the non-colliding MAC address of a datagram received on the network port with the colliding MAC address and transmit the datagram with the colliding MAC address from the device port to the computing device. The apparatus includes a normal transmission module configured to, in response to the MAC address assigned to the computing device not matching a colliding MAC address from the list of colliding MAC addresses, transmit, via the network port and the device port, datagrams comprising the MAC address assigned to the computing device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
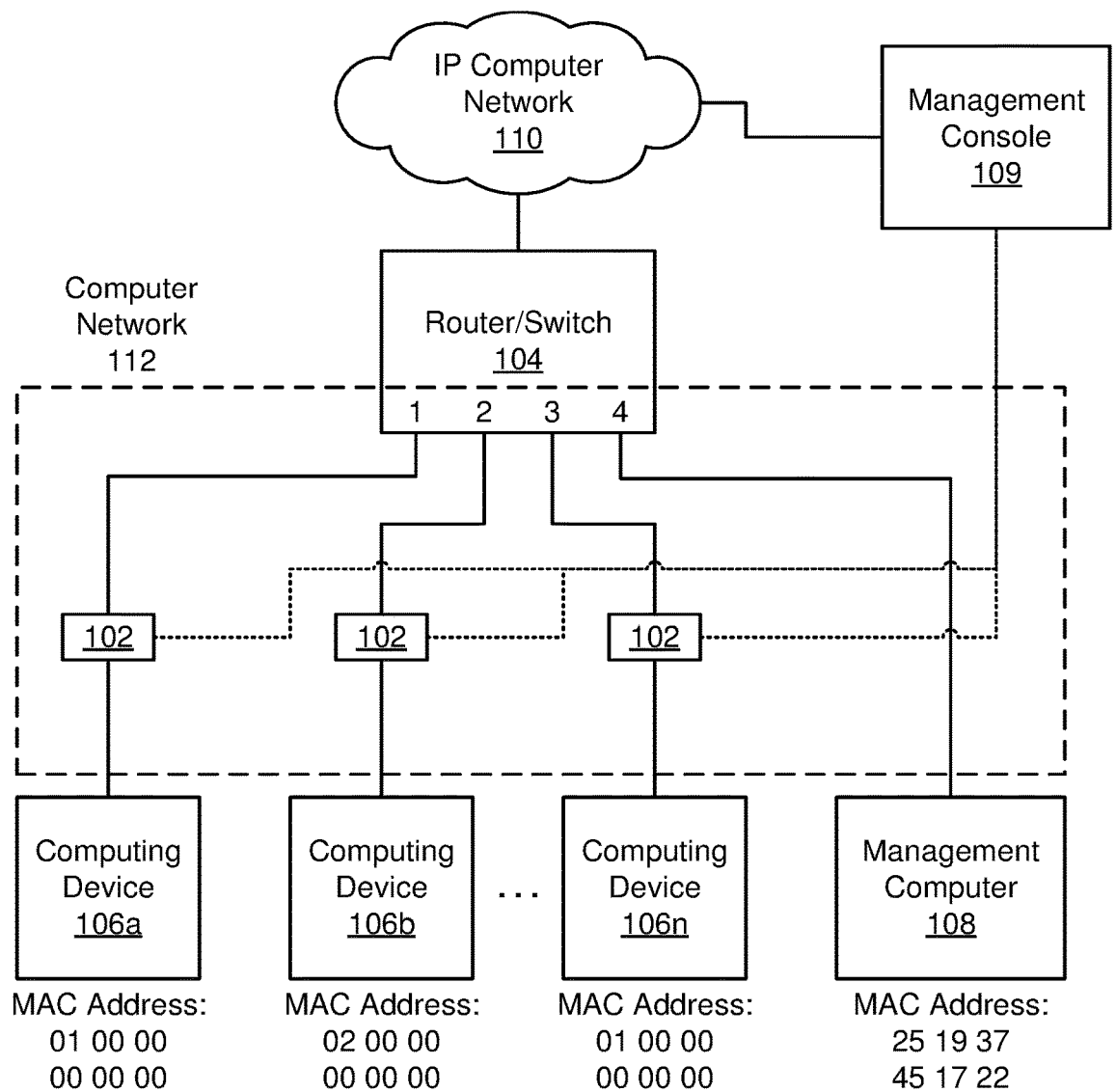
FIG. 1A is a schematic block diagram illustrating a system with a readdressing apparatus in dongle form between computing devices and a combination router/switch, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the- shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

An apparatus for detecting and correcting colliding MAC addresses includes a device port configured to connect to a computing device that includes a colliding MAC address that has a potential to collide with other MAC addresses of other computing devices within a computer network. The apparatus includes a network port configured to connect to a network device. The apparatus includes a reassignment module configured to assign a non-colliding MAC address to be used in place of the colliding MAC address of the computing device and a replacement module configured to replace the colliding MAC address of a datagram received on the device port with the non-colliding MAC address and transmit the datagram with the non-colliding MAC address from the network port to the network device, and to replace the non-colliding MAC address of a datagram received on the network port with the colliding MAC address and transmit the datagram with the colliding MAC address from the device port to the computing device.

In some embodiments, the reassignment module includes an address pool of non-colliding MAC addresses, and the apparatus includes a selection module configured to select a non-colliding MAC address from the address pool. The reassignment module assigns the selected non-colliding MAC address to be used in place of the colliding MAC address. In other embodiments, the selection module selects the non-colliding MAC address in response to a selection command. In other embodiments, selection command includes a command input by a user over a user interface and/or a command received over a management network.

In other embodiments, the selection module selects the non-colliding MAC address using a selection algorithm. In other embodiments, the selection algorithm selects the non-colliding MAC address from the address pool using a random address generator algorithm configured to randomly select a non-colliding MAC address. In other embodiments, the selection algorithm selects a different non-colliding MAC address in response to detecting that a computing device of the other computing devices is assigned a MAC address that matches a current non-colliding MAC address or the colliding MAC address of the computing device.

In some embodiments, the apparatus includes a management module configured to communicate with a management console. In various embodiments, the management module, through the management console, is configured to determine if a MAC address assigned to the computing device is a colliding MAC address, select a non-colliding MAC address, provide one or more non-colliding MAC addresses, and/or allow transmission, via the network port and the device port, of datagrams with the MAC address assigned to the computing device in response to determining that the MAC address assigned to the computing device is not a colliding MAC address. In further embodiments, the apparatus includes a management port configured to communicate management commands between the management module and the management console.

In some embodiments, the apparatus includes a potential collision module configured to compare a MAC address assigned to the computing device with a list of colliding MAC addresses. In the embodiments, the reassignment module assigns the non-colliding MAC address to be used in place of the colliding MAC address of the computing device in response to the MAC address assigned to the computing device matching a colliding MAC address of the list of colliding MAC addresses. The MAC address assigned to the computing device is the colliding MAC address. In other embodiments, the apparatus includes a normal transmission module configured to, in response to the MAC address assigned to the computing device not matching a colliding MAC address from the list of colliding MAC addresses, transmit, via the network port and the device port, datagrams with the MAC address assigned to the computing device.

In some embodiments, the device port, the network port, the reassignment module and the replacement module are housed in a dongle, a switch, a hub, or a switch portion of a router. In other embodiments, the device port, the network port, the reassignment module and the replacement module are housed in a dongle and the device port and the network port each have jacks for connection to a network cable, the device port has a connection configured to connect to the computing device and the network port has a jack for a network cable, or the network port has a connection configured to connect to the network device and the device port has a jack for a network cable.

A method for detecting and correcting colliding MAC addresses includes assigning a non-colliding MAC address to be used in place of a colliding MAC address of a computing device. The colliding MAC address has a potential to collide with other MAC addresses of other computing devices within a computer network. The method includes replacing the colliding MAC address of a datagram received on a device port with the non-colliding MAC address and transmitting the datagram with the non-colliding MAC address from a network port to a network device. The device port is configured to connect to the computing device and the network port is configured to connect to the network device. The method includes replacing the non-colliding MAC address of a datagram received on the network port with the colliding MAC address and transmitting the datagram with the colliding MAC address from the device port to the computing device.

In some embodiments, the method includes selecting a non-colliding MAC address from an address pool of non-colliding MAC addresses. Assigning the non-colliding MAC address to be used in place of the colliding MAC address includes assigning the selected non-colliding MAC address to be used in place of the colliding MAC address. In other embodiments, selecting the non-colliding MAC address is in response to a selection command. The selection command includes a command input by a user over a user interface and/or a command received over a management network. In other embodiments, selecting the non-colliding MAC address includes selecting the non-colliding MAC address using a selection algorithm. In some embodiments, the selection algorithm selects the non-colliding MAC address from an address pool using a random address generator algorithm configured to randomly select a non-colliding MAC address. In other embodiments, the selection algorithm selects a different non-colliding MAC address in response to detecting that a computing device of the other computing devices is assigned a MAC address that matches one of a current non-colliding MAC address or the colliding MAC address of the computing device.

In some embodiments, the method includes comparing a MAC address assigned to the computing device with a list of colliding MAC addresses. Assigning the colliding MAC address to be used in place of the colliding MAC address of the computing device is in response to the MAC address assigned to the computing device matching a colliding MAC address of the list of colliding MAC addresses, and the MAC address assigned to the computing device is the colliding MAC address. In other embodiments, in response to the MAC address assigned to the computing device not matching a colliding MAC address from the list of colliding MAC addresses, the method includes transmitting, via the network port and the device port, datagrams that include the MAC address assigned to the computing device. In other embodiments, the method includes exchanging management commands with a management console. The management commands, in various embodiments, includes determining if a MAC address assigned to the computing device is a colliding MAC address, selecting a non-colliding MAC address, providing a non-colliding MAC address, and/or allowing transmission, via the network port and the device port, of datagrams comprising the MAC address assigned to the computing device in response to determining that the MAC address assigned to the computing device is not a colliding MAC address.

An apparatus for detecting and correcting colliding MAC addresses includes a device port configured to connect to a computing device with a MAC address assigned to the computing device. The apparatus includes a network port configured to connect to a network device of a computer network, where the network device is connected to one or more other computing devices, and a potential collision module configured to compare the MAC address assigned to the computing device with a list of colliding MAC addresses. The colliding MAC addresses of the list of colliding MAC addresses each have a potential to collide with other MAC addresses of the other computing devices within the computer network. The apparatus includes a selection module configured to, in response to the MAC address assigned to the computing device matching a colliding MAC address of the list of colliding MAC addresses, select a non-colliding MAC address from an address pool with non-colliding MAC addresses, where the MAC address assigned to the computing device is a colliding MAC address. The apparatus includes a reassignment module configured to assign the selected non-colliding MAC address to be used in place of the colliding MAC address of the computing device, and a replacement module configured to replace the colliding MAC address of a datagram received on the device port with the non-colliding MAC address and transmit the datagram with the non-colliding MAC address from the network port to the network device, and to replace the non-colliding MAC address of a datagram received on the network port with the colliding MAC address and transmit the datagram with the colliding MAC address from the device port to the computing device. The apparatus includes a normal transmission module configured to, in response to the MAC address assigned to the computing device not matching a colliding MAC address from the list of colliding MAC addresses, transmit, via the network port and the device port, datagrams comprising the MAC address assigned to the computing device.

In some embodiments, the apparatus includes a management module configured to communicate with a management console. The management module, through the management console, is configured to determine if a MAC address assigned to the computing device is a colliding MAC address, select a non-colliding MAC address, provide one or more non-colliding MAC addresses, and/or allow transmission, via the network port and the device port, of datagrams with the MAC address assigned to the computing device in response to determining that the MAC address assigned to the computing device is not a colliding MAC address.

FIG. 1A is a schematic block diagram illustrating a system 100 with a readdressing apparatus 102 in dongle form between computing devices 106a-106n (generically or collectively "106") and a combination router/switch 104, according to various embodiments. The system 100 includes a readdressing apparatus 102 between each computing device 106 and the router/switch 104 to provide a solution where some or all of the computing devices 106 may have MAC addresses that are the same. The system 100 includes a management computer 108 and an IP computer network 110 connected to the router/switch 104. The system 100 is described in more detail below.

MAC addresses are a finite resource in ever expanding market of computing devices that require a MAC address. While MAC addresses were assigned to standard devices, such as computers, printers, and networking devices, many additional devices, such as Internet of Things ("IOT") devices, appliances, smartphones, etc. now require a MAC address for network connections. Companies are typically assigned a block of MAC addresses and are required to carefully assign new devices a MAC address from a pool of assigned MAC addresses. The companies may run out of MAC addresses and may seek to reuse MAC addresses previously used on older devices assumed to be out of service. In addition, companies often do not assign a MAC address to a device to prototype address or until after qualification testing so that MAC addresses are not wasted on non-compliant devices.

In particular environments, computing devices 106 are in a form where MAC addresses of the computing devices 106 may collide. For example, computing devices 106 may not have a unique MAC address assigned in various circumstances. In some instances, the computing devices 106 are prototypes and thus do not have an assigned MAC address and may have a generic MAC address. In other instances, the computing devices 106 are connected to a computer network 112 for testing during a manufacturing process, which may occur before final individualization where a MAC address is assigned. The newly manufactured computing devices 106 may have a generic MAC address until a final step in manufacturing where a unique MAC address is assigned. In other situations, a computing devices 106 may be very old and may an obsolete MAC address that has been reused so that two computing devices 106 with the same MAC address may collide.

The readdressing apparatus 102 includes a device port connected to a computing device 106 with a colliding MAC address and a network port connected to a network device, such as the router/switch 104. The readdressing apparatus 102 assigns a non-colliding MAC address to be used in place of the colliding MAC address of the computing device 106 and for datagrams coming from the computing device that include the colliding MAC address, the readdressing apparatus 102 substitutes the non-colliding MAC address in the header of the datagram before transmitting the datagram to the connected network device (e.g., router/switch 104). Additionally, for datagrams coming from the networking device (e.g., 104) through the network port, the readdressing apparatus 102 strips the non-colliding MAC address from the header of the datagram and inserts the colliding MAC address in the header of the datagram before transmitting the datagram to the computing device 106. Thus, the readdressing apparatus 102 solves collision problems on the network connecting the computing devices 106. The readdressing apparatus 102 is described in more detail with respect to the apparatuses 200, of FIGS. 2 and 3.

The computing devices 106 include any device with an assigned MAC address that can be connected to a computer network 112. The computer network 112 of the system 100 is a private network formed by the wiring between the computing devices 106, the management computer 108, and the router/switch 104. The computer network 112 of the system 100 of FIG. 1A is a simple network, but may include other devices, network equipment, etc. and may be more complex. The computing devices 106 may include laptop computers, desktop computers, tablet computers, workstations, smartphones, printers, appliances, or any other device with a network interface.

The router/switch 104 is a combination device that acts as an interface to an internet protocol ("IP") computer network 110. The IP computer network 110 may include the Internet or other computer network. The computing devices 106 and management computer 108 are connected to ports 1-4 of the switch side of the router/switch 104. The computer network 112 operating between the computing devices 106, management computer 108, and the router/switch 104 operates on layer 2 of the OSI model where the computing devices 106, management computer 108 and router/switch 104 exchange datagrams that include a MAC address and a payload. The computing devices 106 may also be assigned an IP address and a device communicating with IP data packets may reach a computing device 106 or the management computer 108 through the router/switch 104 based on an address resolution protocol ("ARP") table in the router/switch 104.

The management computer 108 is representative of one or more other computing devices connected to the router/switch 104 that have an assigned MAC address, and thus do not need a readdressing apparatus 102. In some embodiments, the management computer 108 is used for testing of the computing devices 106 or for other management functions. In other embodiments, the management computer 108 is on the other side of the router/switch 104. In other embodiments, the management computer 108 is a desktop computer, a workstation, a laptop computer, or the like. In other embodiments, the management computer 108 includes test equipment with a network connection and is used to test the computing devices 106. One of skill in the art will recognize other forms of a management computer 108 and other equipment that may be connected to the computer network 112 on the switch side of the router/switch 104.

Note that the first computing device 106a has a MAC address of 01 00 00 00 00 00, the second computing device 106b has a MAC address of 02 00 00 00 00 00, and the $n^{th}$ computing device 106n has a MAC address of 01 00 00 00 00 00, which would collide with the first computing device 106a. The management computer 108 has a MAC address 25 19 37 45 17 22 that has been assigned and typically would not collide with other MAC addresses. The switch portion of the router/switch 104 is aware of the MAC addresses of connected devices and has a port map. The MAC addresses of the computing devices 106a-106n are generic and are the same or are from a small pool of generic MAC addresses and have a high likelihood of a collision so the readdressing apparatus 102 substitutes a non-colliding MAC address.

In the system 100 of FIG. 1A, the readdressing apparatus 102 has assigned a non-colliding MAC address of 01 23 45 67 12 01 to be used in place of the first computing device 106a, has assigned a non-colliding MAC address of 01 23 45 67 12 02 to be used in place of the second computing device 106b, and has assigned a non-colliding MAC address of 01 23 45 67 12 03 to be used in place of the $n^{th}$ computing device 106n. While the depicted example includes all three readdressing apparatuses 102 having an assigned non-colliding MAC address, in other embodiments, only a portion of the readdressing apparatuses 102 select a non-colliding MAC address. For example, the readdressing apparatuses 102 connected to the first and second computing devices 106a, 106b may pass through the assigned MAC addresses while the readdressing apparatus 102 connected to the $n^{th}$ computing device 106n may assign a non-colliding MAC address.

The router portion of the router/switch 104 includes an ARP table with the MAC addresses of the computing devices 106 as seen from the router/switch 104 paired with IP addresses within the subnet of the computer network 112. The ARP table includes an IP address 192.168.1.1 assigned to the MAC address 01 23 45 67 12 01, which corresponds to the first computing device 106a. Likewise, the ARP table includes an IP address 192.168.1.2 assigned to the MAC address 01 23 45 67 12 02, which corresponds to the second computing device 106b, and includes an IP address 192.168.1.2 assigned to the MAC address 01 23 45 67 12 03, which corresponds to the $n^{th}$ computing device 106n. For the management computer 108, the ARP table pairs the assigned MAC address of 25 19 37 45 17 22 to 192.168.1.4. If a computing device 106 or the management computer 108 sends a data packet with an IP address of 192.168.1.1, the router/switch 104 will forward the data packet to the first computing device 106a.

In some embodiments, the system 100 includes a management console 109 connected to each readdressing apparatus 102 over a management network (dashed lines). As depicted, the management network is an out-of-band ("OOB") management network using network wiring separate from network wiring for normal data transmissions. In the embodiment, the readdressing apparatuses 102 include a separate management port. In other embodiments, the management console 109 is connected to the IP computer network 110 or to the computer network (for example on a port of the router/switch 104—not shown). In some embodiments, the management network is an in-band ("IB") network and the management console 109 connects to the readdressing apparatuses 102 over the computer network 112 and/or the IP computer network. Where the management network is in-band, communications from the management console 109 to the readdressing apparatuses 102 typically are marked as management data packets and the readdressing apparatuses 102 treat the management data packets differently than typical data packets.

Figure 1B:
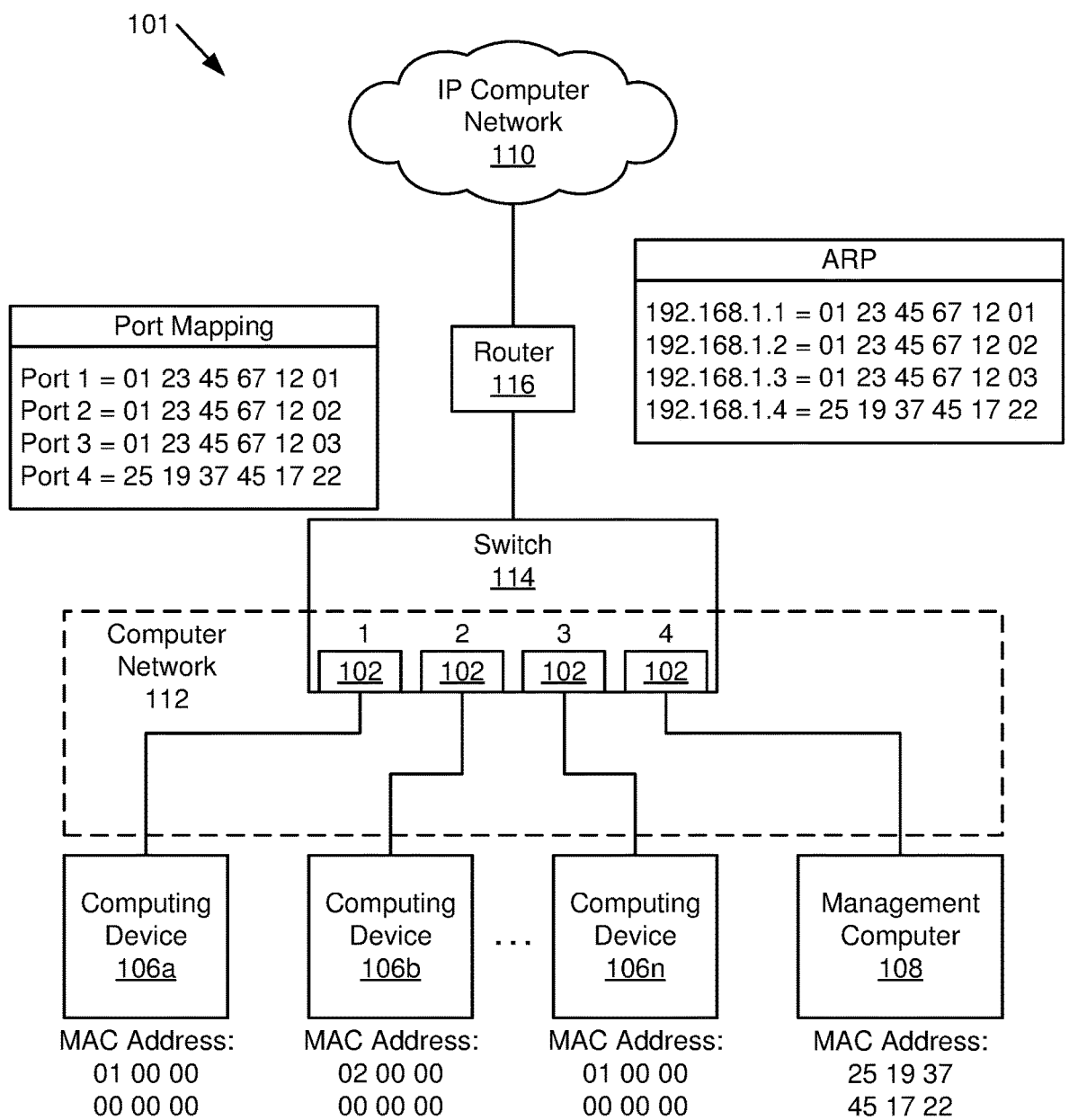
FIG. 1B is a schematic block diagram illustrating a system with a readdressing apparatus in a switch connected to computing devices, according to various embodiments.

FIG. 1B is a schematic block diagram illustrating a system 101 with a readdressing apparatus 102 in a switch 114 connected to computing devices 106, according to various embodiments. The system 101 of FIG. 1B includes readdressing apparatuses 102 in the switch 114 instead of in the dongle form in FIG. 1A. The computing devices 106, management computer 108, computer network 112, and IP computer network 110 are substantially similar those described above in relation to the system 100 of FIG. 1A. The readdressing apparatuses 102 function the same as the readdressing apparatuses 102 of the system 100 of FIG. 1A, but are either built into the switch 114 or connect to the ports 1-4 of the switch 114. Note that port 4 of the switch 114 connected to the management computer 108 includes a readdressing apparatus 102, but in some embodiments, does not act to assign another MAC address but instead uses the MAC address 25 19 37 45 17 22 assigned to the management computer 108.

The system 101 of FIG. 1B includes a router 116 that serves as an interface between the computer network 112 and the IP computer network 110. The system 101 of FIG. 1B also includes a switch 114 separate from the router 116. While a switch 114 is shown in FIG. 1B, the system 101 could also include a hub with readdressing apparatuses 102 or other device that operates on layer 2 of the OSI model. The switch 114 has a port mapping table that is the same as for the system 100 of FIG. 1A and the router includes an ARP table that is the same as for the system 100 of FIG. 1A. The system 101 of FIG. 1B may also include a management console 109, which is not shown for clarity. The management console 109 and management network of the system 101 of FIG. 1B are substantially similar to those described above in relation to the system 100 of FIG. 1A. In other embodiments, the readdressing apparatus 102 is included in the computing device 106 (not shown).

Figure 2:
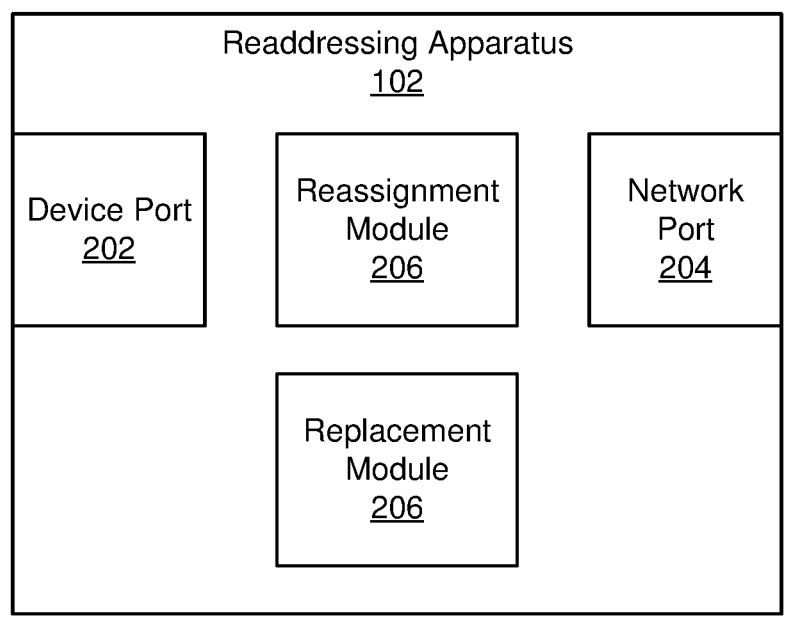
FIG. 2 is a schematic block diagram illustrating an apparatus for detecting and correcting colliding MAC addresses, according to various embodiments.

FIG. 2 is a schematic block diagram illustrating an apparatus 200 for detecting and correcting colliding MAC addresses, according to various embodiments. The apparatus 200 includes a readdressing apparatus 102 with a device port 202, a network port 204, a reassignment module 206, and a replacement module 208, which are described below. In some embodiments, the apparatus 200 is implemented in hardware with hardware circuits and/or a programmable hardware device. In some embodiments, the apparatus is implemented with code executable on a processor, such as a specialty processor or other processor suitable the readdressing apparatus 102.

In some embodiments, the readdressing apparatus 102 is implemented in dongle form. A dongle is a standalone device with network connections. In other embodiments, the readdressing apparatus 102 is built into a switch 114, a hub, a combination router/switch 104, a computing device 106, or other hardware device. One of skill in the art will recognize other forms of the readdressing apparatus 102.

The apparatus 200 includes a device port 202 configured to connect to a computing device (e.g., 106a) with a colliding MAC address that has a potential to collide with other MAC addresses of other computing devices (e.g., 106c-106n) within a computer network 112. The apparatus 200 also includes a network port 204 configured to connect to a network device, such as a switch 114, router/switch 104, hub, router, etc. The network device is connected to one or more of the other computing devices 106. In some embodiments, the device port 202 and/or the network port 204 include a network jack suitable for plugging a network cable. The network jack, in some embodiments, is a registered jack 45 ("RJ45") jack and the computer system 112 communicates using Ethernet. In other embodiments, the device port 202 and/or the network port 204 an optical fiber connector and the computer network 112 is a fiber network. In some embodiments, the device port 202 and/or the network port 204 include a direct attached cable ("DAC") connector.

Where the apparatus 200 is in the form of a dongle, the device port 202 and/or the network port 204, in some embodiments, include a connection to a network cable. In other embodiments, the apparatus 200 is configured to connect directly to the computing device 106 and the device port 202 includes a connector suitable for connection to a jack or connector on the computing device 106. In some examples, the connector on the device port 202 is a plug suitable for connection to a jack on the computing device 106, such as an RJ45 plug, a DAC connector, etc. In other embodiments, the apparatus 200 is configured to connect directly to a network device, such as the router/switch 104 or switch 114, and includes a plug suitable for connection to a jack, termination block, etc. on the network device. The plug, in some embodiments, is an RJ45 plug. In other embodiments where the apparatus 200 is within a network device, the network port 204 is configured to connect to a bus, a slot, a printed circuit board, etc. within the network device. One of skill in the art will recognize other configurations of the device port 202 and the network port 204.

The apparatus 200 includes a reassignment module 206 configured to assign a non-colliding MAC address to be used in place of the colliding MAC address of the computing device 106. In some embodiments, the reassignment module 206 assumes that the MAC address assigned to the computing device 106 is a colliding MAC address and automatically assigns a non-colliding MAC address to be used in place of the colliding MAC address of the computing device 106. In other embodiments, the reassignment module 206 determines if the MAC address assigned to the computing device 106 is a colliding MAC address. In some examples, the reassignment module 206 detects a colliding MAC address from datagrams, data packets, etc. received over the network port 204 and assigns a non-colliding MAC address. In other embodiments, the reassignment module 206 and/or apparatus 200 determines if the MAC address assigned to the computing device 106 is a colliding MAC address, as will be explained in more detail with regard to the apparatus 300 of FIG. 3.

In some embodiments, the reassignment module 206 includes a single non-colliding MAC address and assigns the single non-colliding MAC address to be used in place of the colliding MAC address of the computing device 106. In other embodiments, the reassignment module 206 selects a non-colliding MAC address from a pool of non-colliding MAC addresses. In some embodiments, the reassignment module 206 is directed to select a particular non-colliding MAC address. Selection of a non-colliding MAC address is described in more detail with regard to the apparatus 300 of FIG. 3.

The apparatus includes a replacement module 208 configured to replace the colliding MAC address of a datagram received on the device port 202 with the non-colliding MAC address and transmit the datagram with the non-colliding MAC address from the network port 204 to the network device, and to replace the non-colliding MAC address of a datagram received on the network port 204 with the colliding MAC address and transmit the datagram with the colliding MAC address from the device port to the computing device. In some embodiments, the replacement module 208 receives a datagram, strips the MAC address from the header of the datagram, adds either the colliding MAC address for datagrams going to the computing device 106, or the non-colliding MAC address for datagrams going to the network device, and then transmits the modified datagram. Thus, the apparatus 200 prevents collisions because the network port side of the apparatus 200 communicates using the non-colliding MAC address and the computing device side of the apparatus 200 communicates using the colliding MAC address of the computing device 106.

Figure 3:
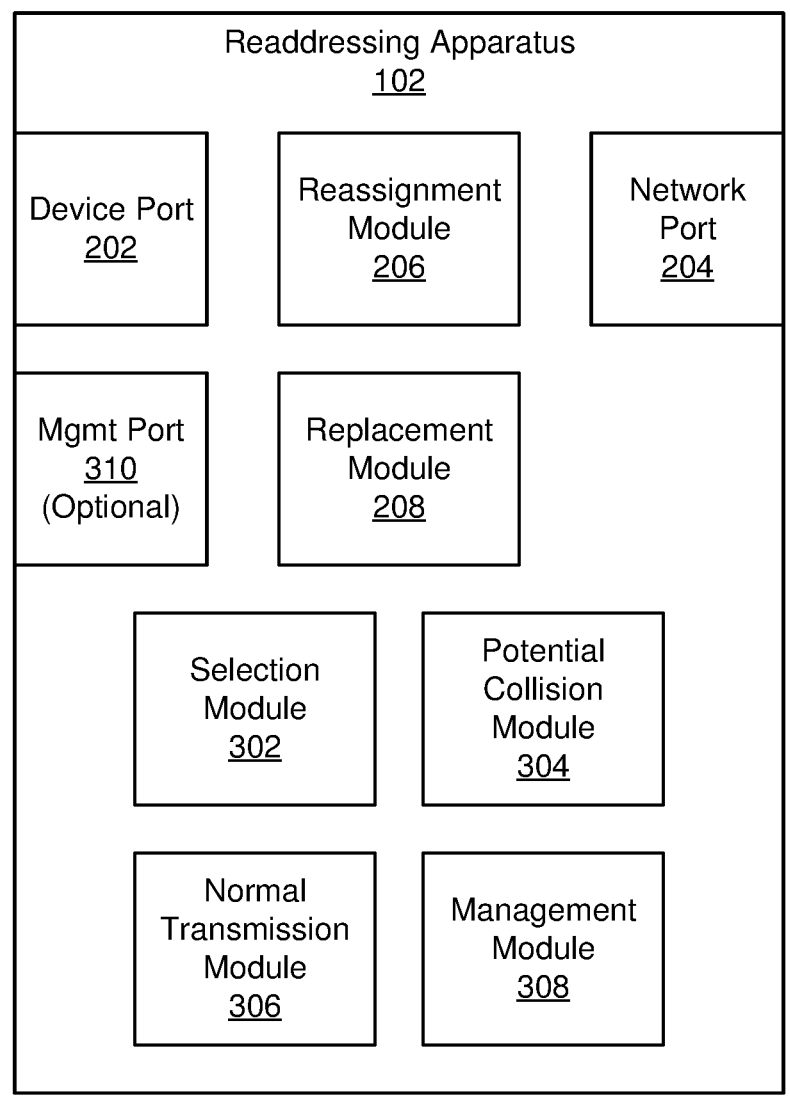
FIG. 3 is a schematic block diagram illustrating another apparatus for detecting and correcting colliding MAC addresses, according to various embodiments.

FIG. 3 is a schematic block diagram illustrating another apparatus 300 for detecting and correcting colliding MAC addresses, according to various embodiments. The apparatus 300 includes a readdressing apparatus 102 with a device port 202, a network port 204, a reassignment module 206, and a replacement module 208, which are substantially similar to those described above in relation to the apparatus 200 of FIG. 2. In various embodiments, the apparatus 300 includes a selection module 302, a potential collision module 304, a normal transmission module 306, a management module 308, and/or a management port 310, which are described below. In various embodiments, the apparatus 300 is implemented in a similar way as the apparatus 200 of FIG. 2.

In some embodiments, the reassignment module 206 includes an address pool of non-colliding MAC addresses and the apparatus 300 includes a selection module 302 configured to select a non-colliding MAC address from the address pool. The reassignment module 206 assigns the selected non-colliding MAC address to be used in place of the colliding MAC address. In one embodiment, the address pool includes a small number of non-colliding addresses and the selection module 302 selects a non-colliding MAC address from the small number of non-colliding MAC addresses of the address pool. For example, the address pool may have 24 non-colliding MAC addresses where the number of computing devices 106 with colliding MAC addresses is anticipated to be less than 24.

The selection module 302, in some embodiments, selects a different non-colliding MAC address for each computing device 106 in the computer network 112. In some embodiments, the selection module 302 selects a non-colliding MAC address for each computing device 106 based on user input. In other embodiments, the selection module 302 detects MAC addresses of other computing devices 106 and selects a non-colliding MAC address that is not currently being used. In some embodiments, the user input is by way of a user interface of a device, such as the management computer 108, connected to the apparatus 300. In other embodiments, the apparatus 300 includes a user interface, which may include one or more buttons, an electronic display, etc. to allow a user to select a non-colliding MAC address from the address pool. In other embodiments, the selection module 302 receives a selection from a user over a management network, which is described in more detail below with respect to the management module 308.

In other embodiments, the selection module 302 selects the non-colliding MAC address using a selection algorithm. In some embodiments, the address pool is a larger block of addresses and the selection algorithm selects a non-colliding MAC address from available addresses in the address pool. In some embodiments, the address pool is large enough so that selecting a random non-colliding MAC address from the address pool provides a statistically small chance of a collision. In the embodiments, the selection algorithm uses a random address generator or other random selection routine to select a non-colliding MAC address from the address pool. In other embodiments, the selection algorithm selects a different non-colliding MAC address in response to detecting that a computing device (e.g., 106a) of the other computing devices (e.g., 106b-106n) is assigned a MAC address that matches a current non-colliding MAC address or the colliding MAC address of the computing device 106a. In other embodiments, the selection algorithm selects non-colliding MAC addresses from the address pool on a rotating basis. One of skill in the art will recognize other ways for the selection module 302 to select a non-colliding MAC address.

In some embodiments, the apparatus 300 includes a potential collision module 304 configured to compare a MAC address assigned to the computing device 106 with a list of colliding MAC addresses and the reassignment module 206 assigns the non-colliding MAC address to be used in place of the colliding MAC address of the computing device 106 in response to the MAC address assigned to the computing device 106 matching a colliding MAC address of the list of colliding MAC addresses. Where the potential collision module 304 determines that the MAC address assigned to the computing device 106 is a colliding MAC address, the MAC address assigned to the computing device is referred to as the colliding MAC address.

In some embodiments, the potential collision module 304 has a list of potential colliding MAC addresses. In some embodiments, the list of potential colliding MAC addresses includes generic or default MAC addresses typically assigned to a computing device 106 or defaulted into the computing device 106 during manufacture. In other embodiments, the list of potential colliding MAC addresses includes MAC addresses of devices on the computer network 112. In other embodiments, the list of potential colliding MAC addresses include obsolete MAC addresses that have been re-used. In other embodiments, the list of potential colliding MAC addresses includes MAC addresses that have been assigned to apparatuses 300 connected to other computing devices 106b-106n. One of skill in the art will recognize other potentially colliding MAC addresses to include in the list of potential colliding MAC addresses.

In some embodiments, the apparatus 300 includes a normal transmission module 306 configured to, in response to the potential collision module 304 determining that a MAC address assigned to the computing device 106 does not match a colliding MAC address from the list of colliding MAC addresses, transmit, via the network port 204 and the device port 202, datagrams that include the MAC address assigned to the computing device 106. As depicted in the system 101 of FIG. 1B, a switch 114 (or possibly a hub) may include a readdressing apparatus 102 connected to a device such as the management computer 108 that does not need to be readdressed. In the embodiments, potential collision module 304 determines that the address of the connected device does not have a colliding MAC address and the normal transmission module 306 passes datagrams without changing the MAC address in the header of the datagrams.

In some embodiments, the apparatus 300 includes a management module 308 configured to communicate with the management console 109 to control some operations of the readdressing apparatus 102. In some embodiments, the apparatus 300 includes a management port 310 and the management module 308 communicates with the management console 109 over the management port 310. In some embodiments, the management module 308 allows user access to the readdressing apparatus 102 through the management console 109.

In some embodiments, the management module 308, through the management console 109, is configured to determine if a MAC address assigned to the computing device 106 is a colliding MAC address, select a non-colliding MAC address, and/or provide one or more non-colliding MAC addresses. In other embodiments, the management module 308, through the management console 109, is configured to allow the replacement module 206 to transmit, via the network port 204 and the device port 202, datagrams with the MAC address assigned to the computing device 106 in response to determining that the MAC address assigned to the computing device 106 is not a colliding MAC address. One of skill in the art will recognize other ways for the management module 308 and management console 109 to manage operations of the apparatus 300.

In some embodiments, the apparatus 300 includes a management port 310 separate from the network port 204 and the device port 202 configured to connect to a management network. The management port 310, in some embodiments, is configured to communicate management commands between the management module 308 and the management console 109. The management port 310 is typically configured for use with an out-of-band management network.

Figure 4:
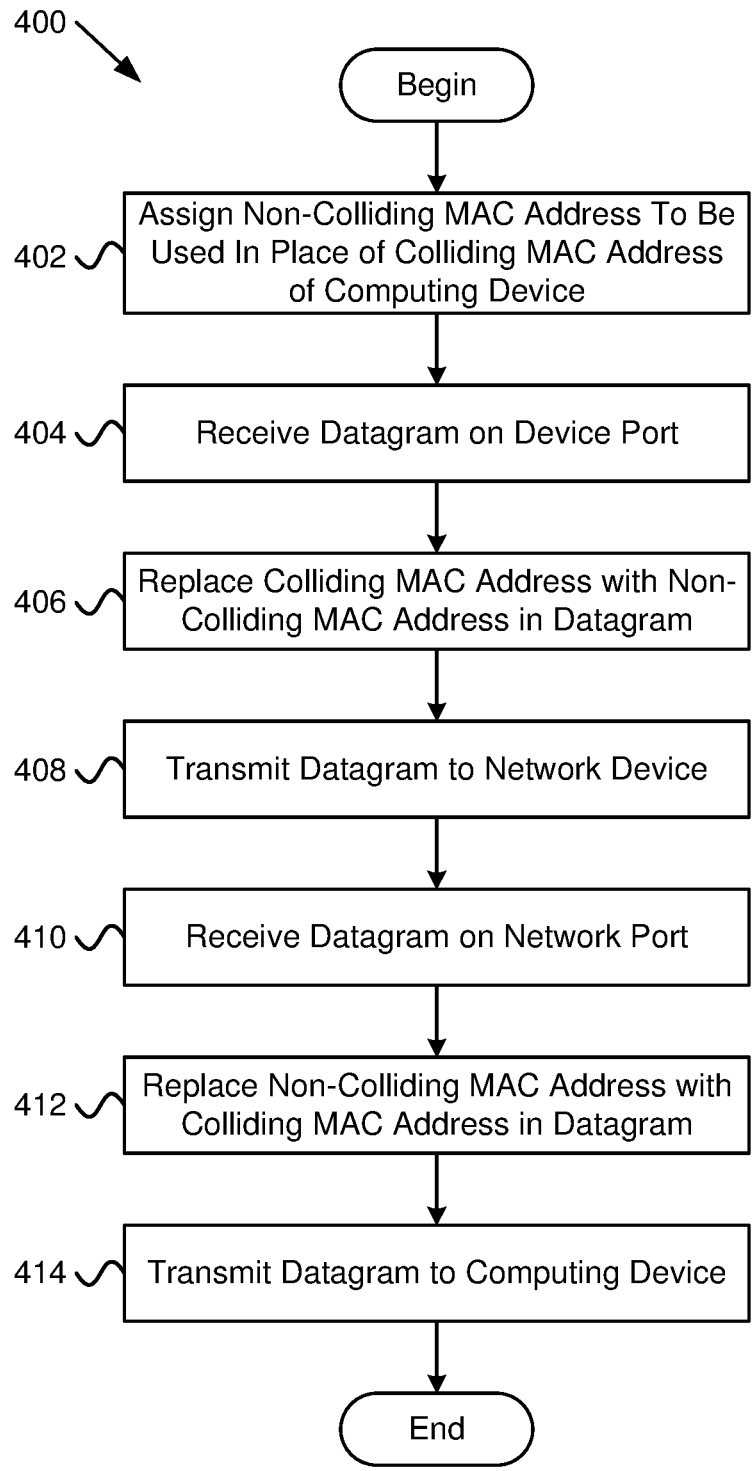
FIG. 4 is a schematic flow chart diagram illustrating a method for detecting and correcting colliding MAC addresses, according to various embodiments.

FIG. 4 is a schematic flow chart diagram illustrating a method 400 for detecting and correcting colliding MAC addresses, according to various embodiments. The method 400 begins and assigns 402 a non-colliding MAC address to be used in place of a colliding MAC address of a computing device (e.g., 106a). The colliding MAC address has a potential to collide with other MAC addresses of other computing devices (e.g., 106b-106n) within a computer network 112. The method 400 receives 404 a datagram on a device port 202 and replaces 406 the colliding MAC address of the datagram received on the device port 202 with the non-colliding MAC address and transmits 408 the datagram with the non-colliding MAC address from a network port 204 to a network device. The device port 202 is configured to connect to the computing device 106a and the network port 204 is configured to connect to the network device. In some embodiments, the network device is connected to one or more of the other computing devices 106b-106n.

The method 400 receives 410 a datagram on the network port 204 and replaces 412 the non-colliding MAC address of the datagram received on the network port 204 with the colliding MAC address and transmits 414 the datagram with the colliding MAC address from the device port 202 to the computing device 106a, and the method 400 ends. In various embodiments, all or a portion of the method 400 is implemented using the device port 202, the network port 204, the reassignment module 206, and/or the replacement module 208.

Figure 5:
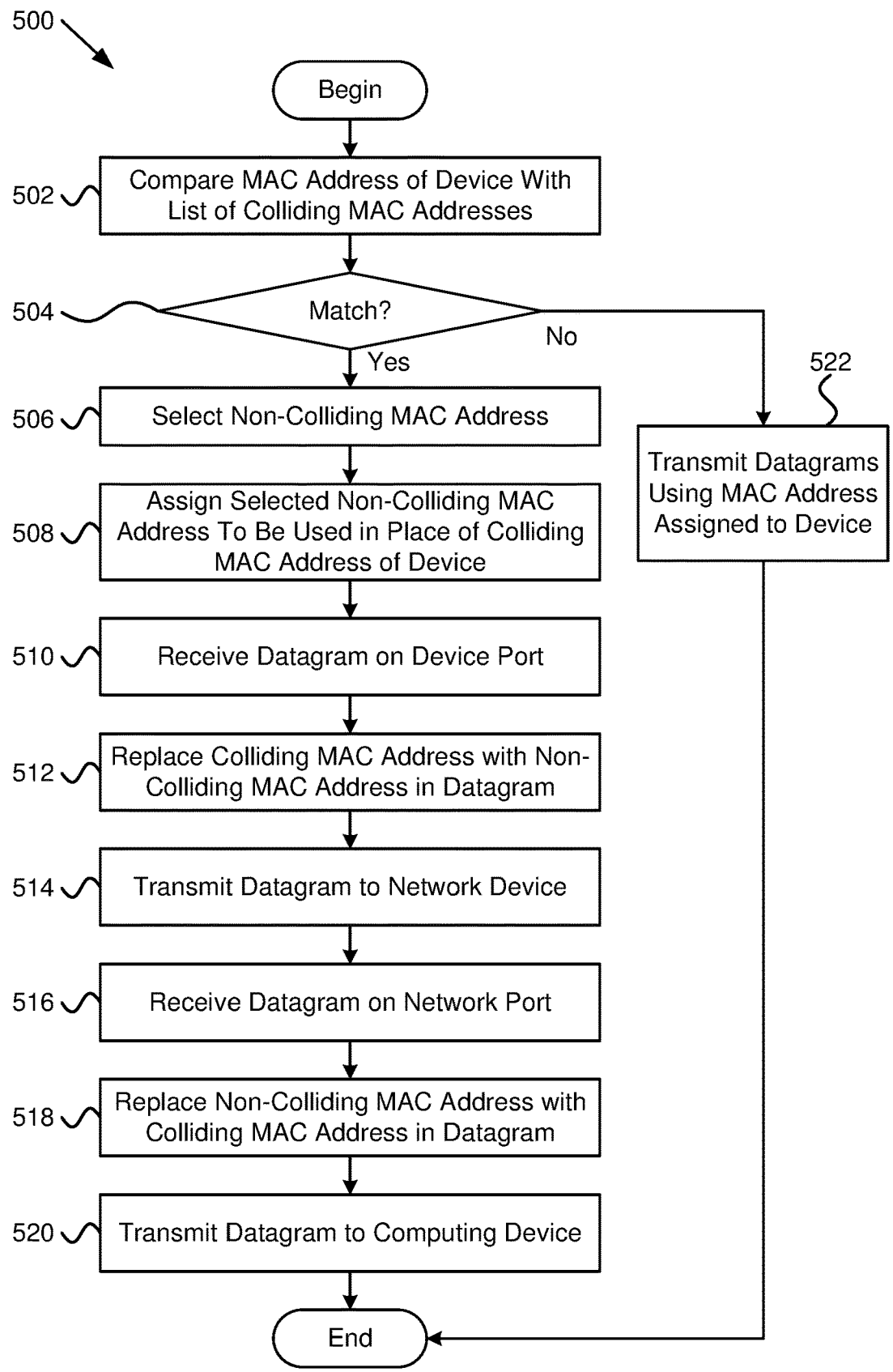
FIG. 5 is a schematic flow chart diagram illustrating another method for detecting and correcting colliding MAC addresses, according to various embodiments.

FIG. 5 is a schematic flow chart diagram illustrating another method 500 for detecting and correcting colliding MAC addresses, according to various embodiments. The method 500 begins and compares 502 a MAC address assigned to a computing device (e.g., 106a) 106 with a list of colliding MAC addresses. The colliding MAC addresses have a potential to collide with other MAC addresses of other computing devices (e.g., 106b-106n) within a computer network 112. The method 500 determines 504 if there is a match between a colliding MAC address on the list of colliding MAC addresses and the MAC address assigned to the computing device 106a.

If the method 500 determines 504 that there is a match between a colliding MAC address on the list of colliding MAC addresses and the MAC address assigned to the computing device 106a, the method 500 selects 506 a non-colliding MAC address and assigns 508 the selected non-colliding MAC address to be used in place of the MAC address assigned to the computing device 106a, which is a colliding MAC address. In some embodiments, the method 500 selects 506 the non-colliding MAC address based on user input. In other embodiments, the method 500 selects 506 the non-colliding MAC address based on a selection algorithm.

The method 500 receives 510 a datagram on a device port 202 and replaces 512 the colliding MAC address of the datagram received on the device port 202 with the non-colliding MAC address and transmits 514 the datagram with the non-colliding MAC address from a network port 204 to a network device. The device port 202 is configured to connect to the computing device 106a and the network port 204 is configured to connect to the network device. The network device is connected to one or more of the other computing devices 106b-106n.

The method 500 receives 516 a datagram on the network port 204 and replaces 518 the non-colliding MAC address of the datagram received on the network port with the colliding MAC address and transmits 520 the datagram with the colliding MAC address from the device port 202 to the computing device 106*a*, and the method 500 ends. If the method 500 determines 504 that the MAC address assigned to the computing device 106*a* does not match a colliding MAC address on the list of colliding MAC addresses, the method 500 transmits 522, via the network port 204 and the device port 202, datagrams with the MAC address assigned to the computing device 106*a*, and the method 500 ends. In various embodiments, all or a portion of the method 400 is implemented using the device port 202, the network port 204, the reassignment module 206, the replacement module 208, the selection module 302, the potential collision module 304, the normal transmission module 306, the management module 308, and/or the management port 310.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A apparatus comprising:
   a device port configured to connect to a computing device comprising a colliding media access control ("MAC") address that has a potential to collide with other MAC addresses of other computing devices within a computer network;
   a network port configured to connect to a network device;
   a reassignment module configured to assign a non-colliding MAC address to be used in place of the colliding MAC address of the computing device; and
   a replacement module configured to:
      replace the colliding MAC address of a datagram received on the device port with the non-colliding MAC address and transmit the datagram with the non-colliding MAC address from the network port to the network device; and
      replace the non-colliding MAC address of a datagram received on the network port with the colliding MAC address and transmit the datagram with the colliding MAC address from the device port to the computing device.

2. The apparatus of claim 1, wherein the reassignment module comprises an address pool of non-colliding MAC addresses and further comprising a selection module configured to select a non-colliding MAC address from the address pool, wherein the reassignment module assigns the colliding MAC address with the selected non-colliding MAC address.

3. The apparatus of claim 2, wherein the selection module selects the non-colliding MAC address in response to a selection command.

4. The apparatus of claim 3, wherein the selection command comprises:
   a command input by a user over a user interface; and/or
   a command received over a management network.

5. The apparatus of claim 2, wherein the selection module selects the non-colliding MAC address using a selection algorithm.

6. The apparatus of claim 5, wherein the selection algorithm selects the non-colliding MAC address from the address pool using a random address generator algorithm configured to randomly select a non-colliding MAC address.

7. The apparatus of claim 5, wherein the selection algorithm selects a different non-colliding MAC address in response to detecting that a computing device of the other computing devices is assigned a MAC address that matches one of a current non-colliding MAC address or the colliding MAC address of the computing device.

8. The apparatus of claim 1, further comprising a management module configured to communicate with a management console, wherein the management module, through the management console, is configured to:
   determine if a MAC address assigned to the computing device is a colliding MAC address;
   select a non-colliding MAC address;
   provide one or more non-colliding MAC addresses; and/or
   allow transmission, via the network port and the device port, of datagrams comprising the MAC address assigned to the computing device in response to determining that the MAC address assigned to the computing device is not a colliding MAC address.

9. The apparatus of claim 8, further comprising a management port configured to communicate management commands between the management module and the management console.

10. The apparatus of claim 1, wherein the device port, the network port, the reassignment module and the replacement module are housed in one of a dongle, a switch, a hub, or a switch portion of a router.

11. The apparatus of claim 10, wherein the device port, the network port, the reassignment module and the replacement module are housed in a dongle and wherein one of:
   the device port and the network port each comprise jacks for connection to a network cable;
   the device port comprises a connection configured to connect to the computing device and the network port comprises a jack for a network cable; or
   the network port comprises a connection configured to connect to the network device and the device port comprises a jack for a network cable.

12. The apparatus of claim 1, further comprising:
   a potential collision module configured to compare a MAC address assigned to the computing device with a list of colliding MAC addresses, wherein the reassignment module assigns the non-colliding MAC address to be used in place of the colliding MAC address of the computing device in response to the MAC address assigned to the computing device matching a colliding MAC address of the list of colliding MAC addresses, and wherein the MAC address assigned to the computing device comprises the colliding MAC address; and
   a normal transmission module configured to, in response to the MAC address assigned to the computing device not matching a colliding MAC address from the list of colliding MAC addresses, transmit, via the network port and the device port, datagrams comprising the MAC address assigned to the computing device.

13. A method comprising:
   assigning a non-colliding media access control ("MAC") address to be used in place of a colliding MAC address of a computing device, the colliding MAC address comprising a potential to collide with other MAC addresses of other computing devices within a computer network;
   replacing the colliding MAC address of a datagram received on a device port with the non-colliding MAC address and transmitting the datagram with the non-colliding MAC address from a network port to a network device, the device port configured to connect to the computing device, the network port configured to connect to the network device; and replacing the non-colliding MAC address of a datagram received on the network port with the colliding MAC address and transmitting the datagram with the colliding MAC address from the device port to the computing device.

14. The method of claim 13, further comprising selecting a non-colliding MAC address from an address pool of non-colliding MAC addresses, assigning the non-colliding MAC address to be used in place of the colliding MAC address comprises assigning the selected non-colliding MAC address to be used in place of the colliding MAC address.

15. The method of claim 13, wherein selecting the non-colliding MAC address is in response to a selection command, the selection command comprising a command input by a user over a user interface and/or a command received over a management network.

16. The method of claim 13, wherein selecting the non-colliding MAC address comprises selecting the non-colliding MAC address using a selection algorithm, wherein:

the selection algorithm selects the non-colliding MAC address from an address pool using a random address generator algorithm configured to randomly select a non-colliding MAC address; and/or the selection algorithm selects a different non-colliding MAC address in response to detecting that a computing device of the other computing devices is assigned a MAC address that matches one of a current non-colliding MAC address or the colliding MAC address of the computing device.

17. The method of claim 13, further comprising:

comparing a MAC address assigned to the computing device with a list of colliding MAC addresses, wherein assigning the non-colliding MAC address to be used in place of the colliding MAC address of the computing device is in response to the MAC address assigned to the computing device matching a colliding MAC address of the list of colliding MAC addresses, and wherein the MAC address assigned to the computing device comprises the colliding MAC address; and in response to the MAC address assigned to the computing device not matching a colliding MAC address from the list of colliding MAC addresses, transmitting, via the network port and the device port, datagrams comprising the MAC address assigned to the computing device.

18. The method of claim 13, further comprising exchanging management commands with a management console, the management commands comprising:

determining if a MAC address assigned to the computing device is a colliding MAC address;

selecting a non-colliding MAC address;

providing a non-colliding MAC address; and/or allowing transmission, via the network port and the device port, of datagrams comprising the MAC address assigned to the computing device in response to determining that the MAC address assigned to the computing device is not a colliding MAC address.

19. An apparatus comprising:

a device port configured to connect to a computing device comprising a media access control ("MAC") address assigned to the computing device;

a network port configured to connect to a network device of a computer network, the network device connected to one or more other computing devices;

a potential collision module configured to compare the MAC address assigned to the computing device with a list of colliding MAC addresses, the colliding MAC addresses of the list of colliding MAC addresses each comprising a potential to collide with other MAC addresses of the other computing devices within the computer network;

a selection module configured to, in response to the MAC address assigned to the computing device matching a colliding MAC address of the list of colliding MAC addresses, select a non-colliding MAC address from an address pool comprising non-colliding MAC addresses, wherein the MAC address assigned to the computing device comprises a colliding MAC address;

a reassignment module configured to assign the selected non-colliding MAC address to be used in place of the colliding MAC address of the computing device;

a replacement module configured to:

replace the colliding MAC address of a datagram received on the device port with the non-colliding MAC address and transmit the datagram with the non-colliding MAC address from the network port to the network device; and replace the non-colliding MAC address of a datagram received on the network port with the colliding MAC address and transmit the datagram with the colliding MAC address from the device port to the computing device; and a normal transmission module configured to, in response to the MAC address assigned to the computing device not matching a colliding MAC address from the list of colliding MAC addresses, transmit, via the network port and the device port, datagrams comprising the MAC address assigned to the computing device.

20. The apparatus of claim 19, further comprising a management module configured to communicate with a management console, wherein the management module, through the management console, is configured to:

determine if a MAC address assigned to the computing device is a colliding MAC address;

select a non-colliding MAC address;

provide one or more non-colliding MAC addresses; and/or allow transmission, via the network port and the device port, of datagrams comprising the MAC address assigned to the computing device in response to determining that the MAC address assigned to the computing device is not a colliding MAC address.

* * * * *